Patented Mar. 2, 1943

2,312,329

UNITED STATES PATENT OFFICE 2,312,329

SYNTHETIC MOUNTING MATERIAL FOR MICROSCOPIC SPECIMENS

William D. Fleming, Edgewood, Md.

No Drawing. Application November 17, 1939,
Serial No. 304,940

7 Claims. (Cl. 260—67)

(Granted under the act of March 3, 1883, as
amended April 30, 1928; 370 O. G. 757)

This invention described herein may be manufactured and used by or for the Government for governmental purposes, without the payment to me of any royalty thereon.

This invention generically relates to an improved mounting material for histological, pathological and bacteriological specimens, more especially it is directed to a synthetic resin adapted to serve as a substitute for the natural resins such as Canadian balsam and Singapore dammar, now generally used as a mounting material in microscopic work.

One object of this invention is to provide a synthetic mounting material of the character specified which owing to its high refractive index, will impart a greater degree of transparency to the specimen on the slide, thus affording an increase in visibility and in consequence a more comprehensive microscopic examination.

Another object of this invention is to produce a synthetic mounting material for microscopic studies, which has a very pale yellow color in mass but is colorless in thin layers, has good glass adhering properties and is inert with respect to microscopic stains.

Another object of this invention is to provide a synthetic and homogeneous resin of the type designated which is neutral, color stable, will not become acid with age, more uniform in its properties than are the natural resins and readily soluble in benzene hydrocarbons.

Another object of this invention is to provide a synthetic resin which may be easily prepared from abundantly available inexpensive chemicals, and while resembling Canadian balsam, has the advantage of a higher refractive index, paler color and of being permanently neutral and nonreactive.

Briefly stated, the synthetic resin forming the subject matter of the instant application is prepared by reacting naphthalene with formaldehyde in the presence of suitable catalytic agents and under controlled temperature conditions, purifying the resultant resin to effect removal of undesirable by-products and residues, treating the purified resin with a plasticizer to render it less brittle and if the refractive index of the resulting compound is too high further treating the plasticized resin with a styrene polymerization product.

Canadian balsam and gum dammar which are natural resins are available on the market in lump form, but if clean and free of debris are very expensive. Both of these resins yellow with age and are acidic. Moreover under wartime conditions the supply of Canadian balsam and gum dammar may be limited or completely discontinued, and for this reason a synthetic substitute having the requisite properties for microscopic work is highly desirable. It is therefore the aim and purpose of this invention to provide a substitute synthetic product which not only serves the purpose of Canadian balsam and gum dammar, but in many respects is superior to these resins, since it has a refractive index of N/D 1.67 and higher as compared to N/D 1.535 of Canadian balsam and N/D 1.542 of gum dammar, is permanently neutral, does not react with microscopic stains and will not change color or become brittle with age.

To facilitate the discussion of this invention, the synthesis of the finished product from the raw material will be considered in the following order: production of crude resin; purification of resin; plasticization and refraction index control.

*Production of crude resin.*—200 cc. of 37 percent formaldehyde solution (formalin) are poured over 200 grams of naphthalene and the mixture chilled. To this there is very slowly added a chilled mixture of 600 cc. of glacial acetic and 300 cc. of concentrated sulphuric acid (sp. gr. 1.84).

The temperature of the mass for the first six hours is held below 10° C. At the expiration of this period the temperature of the mass is allowed to rise slowly but held below 30° C. for the next twenty-four hours. When this time interval has been completed the temperature is brought up to but not allowed to exceed 60° C. and held at this point until a sample withdrawn from the mass and washed in water, becomes brittle at room temperature which indicates that the resin is now in condition for purification. Throughout this treatment the mass must be continuously stirred or kneaded.

*Purification of resin.*—The mass of resin is now removed from the mother liquid and washed by kneading, first in hot water, then in a sodium carbonate solution until the wash water remains alkaline. It is then chilled, ground to a fine powder in a chilled mortar and filtered. The powder on the filter is then successively washed with cold dilute sodium carbonate solution, cold water and cold 95-percent alcohol. When this treatment has been concluded the powder is removed from the filter and washed by kneading, first in several changes of boiling 95-percent alcohol and then in a final change of boiling absolute alcohol.

The resin is next chilled, powdered in a dry mortar, the powder air-dried and then dissolved in xylene until the solvent has acquired the consistency of a thin syrup. At this stage a small amount of anhydrous sodium carbonate is added. This mixture after being allowed to stand for a short time is then filtered and evaporated to the proper consistency for use.

The resin thus prepared in xylene solution has a very pale yellow color with no trace of red or fluorescence. When a thin layer of this solution is placed on a slide and dried for two days at a temperature of 100° C. the resin becomes hard and brittle but its pale yellow color remains constant.

The refractive index of a sample (in which enough xylene remained to soften the resin sufficiently to permit closing the refractometer prism) was N/D 1.67. With a further loss of xylene the refractive index becomes even greater.

In the preceding purification process the temperature control prevents the formation of highly colored products; the alkali treatment removes occluded acids and the alcohol wash eliminates unreacted naphthalene and water.

*Plasticization.*—Microscopic mounts made with natural resins such as Canadian balsam and gum dammar tend to become brittle with age. To overcome this defect in the instant invention and to otherwise improve the xylene solution of the resin, there is added to the latter a small amount of plasticizer and for this purpose the following plasticizers may be resorted to: dibutyl phthalate, triphenyl phosphate or tricresyl phosphate. For example 1 gram of triphenyl phosphate added to a 100 cc. of a 50-percent xylene solution of the resin will give very good results.

*Refraction index control.*—In preparing microscopic specimens for examination, a high refractive index is usually advantageous, but it is conceivable that a situation might arise in which a mounting material would be required with a refractive index of less than N/D 1.67. To meet this situation a refractive index control, in the nature of a xylene solution of polystyrene (metastyrene) is added to a xylene solution of the instant resin. Polystyrene is a xylene solution of a resin formed by polymerizing styrene with heat at a temperature of not to exceed 100° C. For instance a mixture of equal parts of 50-percent xylene solution of the instant resin having a refractive index of N/D 1.67 mixed with a 50-percent solution of polystyrene affords a refractive index of N/D 1.62. This mixture of resins may be used with or without a plasticizer depending upon the exigencies of the situation.

In conclusion it will be apparent, this invention provides a chemically and physically stable synthetic mounting material, having a high refractive index and adapted to effectively replace the expensive material resins (Canadian balsam and dammar), now so extensively used in microscopy and which may be produced at low cost from abundantly available inexpensive raw materials.

Having described my invention, what I claim as new and wish to secure by Letters Patent is:

1. A process for producing a synthetic mounting for microscopic media comprising reacting naphthalene and formaldehyde within a temperature range of −10° C. to 60° C. and in the presence of an acid catalyst, the reaction being initiated at −10° C. and slowly raised over a certain time interval to 60° C., purifying the reaction product with successive alkali and alcohol washes to remove occluded acids, naphthalene and water and under temperature conditions to prevent the formation of highly colored products, and then dissolving the purified product in a normally liquid aromatic solvent to produce a neutral resinous compound inert with respect to microscopic stains and having a refractive index higher than that of either Canadian balsam or the gum dammars.

2. A process for producing a synthetic mounting for microscopic media comprising reacting naphthalene and formaldehyde within a temperature range of −10° C. to 60° C. and in the presence of an acid catalyst, the reaction being initiated at −10° C. and slowly raised over a thirty hour interval to 60° C., purifying the reaction product with successive alkali and alcohol washes to remove occluded acids, naphthalene and water, the temperatures of the reaction product and the washes being such as to prevent the formation of highly colored products and then dissolving the purified product in a normally liquid aromatic solvent to produce a neutral resinous compound inert with respect to microscopic stains and having a refractive index of at least N/D 1.67.

3. A process for producing a synthetic mounting for microscopic media comprising reacting naphthalene and formaldehyde within a temperature range of −10° C. to 60° C. and in the presence of an acid catalyst, the reaction being initiated at −10° C. and slowly raised over a thirty hour interval to 60° C., purifying the reaction product with successive alkali and alcohol washes, to remove occluded acids, naphthalene and water, the temperatures of the reaction product and the washes being such as to prevent the formation of highly colored products, and then dissolving the purified product in a xylene solution to produce a neutral resinous compound inert with respect to microscopic stains and having a refractive index of at least N/D 1.67.

4. A process for producing a synthetic mounting comprising reacting naphthalene and formaldehyde within a temperature range of −10° C. to 60° C., and in the presence of an acid catalyst, the reaction being initiated at −10° C. and slowly raised over a thirty hour interval to 60° C., purifying the reaction product with successive alkali and alcohol washes to remove occluded acids, naphthalene and water, the temperatures of the reaction product and the washes being such as to prevent the formation of highly colored products, dissolving the purified product in a normally liquid aromatic solvent to produce a resinous compound inert with respect to microscopic stains and having a refractive index higher than that of either Canadian balsam or the gum dammars, and then plasticizing the resinous compound with a triphenyl phosphate plasticizer which will not affect the refractive index characteristics of said compound, whereby to prevent said compound from becoming brittle with age.

5. A process for producing a synthetic mounting medium for microscopic specimens comprising reacting naphthalene and formaldehyde within a temperature range of −10° C. to 60° C. and in the presence of an acid catalyst, the reaction being initiated at −10° C. and slowly raised during a thirty hour interval to 60° C., purifying the reaction product with successive alkali and alcohol washes to remove occluded acids, naphthalene and water, the temperature of the reaction product and the washes being such as to prevent the formation of highly colored products, dissolving the purified product in a normally liquid aromatic solvent to produce a resinous compound inert with respect to microscopic stains and having a high refractive index and then lowering the refractive index of the compound to a selected value by the addition of a polystyrene refractive index control.

6. A process for producing a synthetic mounting medium for microscopic specimens comprising reacting naphthalene and formaldehyde within a temperature range of −10° C. to 60° C. and in the presence of an acid catalyst, the reaction being initiated at −10° C. and slowly raised during a thirty hour interval to 60° C., purifying the reaction compound with successive alkali and alcohol washes to remove occluded acids, naphthalene and water, the temperature of the reaction product and the washes being such as to prevent the formation of highly colored products, dissolving the purified product in a xylene solution to produce a resinous compound inert with respect to microscopic stains and having a high refractive index, lowering said refractive index to a selected value by the addition of a polystyrene refractive index control and then plasticizing the resinous compound with a dibutyl phthalate plasticizer which, without affecting the refractive index characteristics of the compound, will prevent the latter from becoming brittle with age.

7. A process for producing a synthetic mounting medium for microscopic specimens, said medium resembling Canadian balsam and comprising reacting naphthalene and formaldehyde in the presence of concentrated sulphuric acid and glacial acetic acid for a predetermined time interval under controlled temperature conditions, wherein for the initial six hour period of said interval, the temperature is held below 10° C. and then allowed to rise to but held below 30° C. for the next twenty-four hour period of said interval, whereupon the temperature is brought up to but not allowed to exceed 60° C., purifying the reaction product with successive alkali and alcohol washes to remove occluded acids, unreacted naphthalene and water, the temperatures of the reaction product and the washes being such as to prevent the formation of highly colored products, then dissolving the purified product in a normally liquid aromatic solvent, whereby to produce a neutral resinous compound having a refractive index of at least N/D 1.67 and being nonreactive with respect to microscopic stains.

WILLIAM D. FLEMING.